United States Patent
Harper

[11] Patent Number: 5,834,731
[45] Date of Patent: Nov. 10, 1998

[54] LASER TEXTURING APPARATUS WITH BERNOULLI HOLDER

[75] Inventor: Bruce M. Harper, San Jose, Calif.

[73] Assignee: HMT Technology Corporation, Fremont, Calif.

[21] Appl. No.: 869,078

[22] Filed: Jun. 4, 1997

[51] Int. Cl.[6] .................................................. B23K 26/00
[52] U.S. Cl. ................................. 219/121.68; 219/121.82
[58] Field of Search ........................ 219/121.68, 121.69, 219/121.74, 121.82; 360/135; 294/64.3; 414/222, 225; 264/400

[56] References Cited

U.S. PATENT DOCUMENTS

| | | | |
|---|---|---|---|
| 3,740,524 | 6/1973 | Dahlberg et al. | 219/121.69 |
| 4,029,351 | 6/1977 | Apgar et al. | 294/64.3 |
| 4,038,663 | 7/1977 | Day et al. | 347/264 |
| 4,118,058 | 10/1978 | Rahn et al. | 294/64.3 |
| 4,257,637 | 3/1981 | Hassan et al. | 294/64.3 |
| 4,414,592 | 11/1983 | Losee et al. | 360/102 |
| 4,903,717 | 2/1990 | Sumnitsch | 294/64.3 |
| 5,012,463 | 4/1991 | Farnsworth et al. | 369/100 |
| 5,080,549 | 1/1992 | Goodwin et al. | 414/744.8 |
| 5,108,781 | 4/1992 | Ranjan et al. | 427/556 |
| 5,120,927 | 6/1992 | Williams et al. | 219/121.68 |
| 5,293,287 | 3/1994 | Tzur et al. | 360/98.03 |
| 5,322,987 | 6/1994 | Thomas et al. | 219/121.68 |
| 5,513,668 | 5/1996 | Sumnitsch | 134/157 |
| 5,550,696 | 8/1996 | Nguyen | 360/135 |
| 5,595,768 | 1/1997 | Treves et al. | 264/400 |

Primary Examiner—Geoffrey S. Evans
Attorney, Agent, or Firm—LeeAnn Gorthey

[57] ABSTRACT

An apparatus for laser texturing the inner annular region of a substrate is described. The apparatus includes a Bernoulli holder for supporting the disc at a fixed distance from a support face in the holder, and a laser beam for directing a pulsed laser beam on the substrate's inner annular region. Also included is an optical assembly for varying the position of such a spot on such inner annular surface region of the substrate.

3 Claims, 2 Drawing Sheets

LASER TEXTURING APPARATUS WITH BERNOULLI HOLDER

FIELD OF THE INVENTION

The present invention relates to laser texturing of magnetic recording media, and more particularly, to an apparatus for laser texturing an inner annular region of a substrate corresponding to the start/stop region on a magnetic thin-film medium.

REFERENCES

Allen et al., U.S. Pat. No. 4,735,540 (1988).
Bauck, R. C. et al., U.S. Pat. No. 4,743,989 (1988).
Goodwin, D. L. et al., U.S. Pat. No. 5,080,549 (1992).
Harper, B. M., U.S. Pat. No. 5,423,653 (1995).
Nguyen, T. A., U.S. Pat. No. 5,550,696 (1996).
Rahn, O. et al., U.S. Pat. No. 4,118,058 (1978).
Ranjan, R. Y. et al., U.S. Pat. No. 5,108,781 (1992).
Sumnitsch, F., U.S. Pat. No. 4,903,717 (1990).
Sumnitsch, F., U.S. Pat. No. 5,492,566 (2/1996).
Sumnitsch, F., U.S. Pat. No. 5,513,668 (5/1996).
Tsur, I. et al., U.S. Pat. No. 5,293,287 (1994).

BACKGROUND OF THE INVENTION

Over the past several years, a significant increase in recording density in thin-film media magnetic recording disks has been achieved, and there is a continuing effort to increase recording density further. A number of magnetic properties in a thin-film disk are important to achieving high recording density. These include high coercivity, high remanence, and low flying height, that is, a close proximity of the read/write heads to the disk surface. Such proximity decreases overlap of voltage signals in adjacent magnetic domains in the disk, thus permitting an increase in recording density and optimum read-write performance.

To reduce flying height, and to improve wear resistance, it is desirable for the surface of the disk to be as smooth as possible. However, prolonged contact of a read-write head with a very smooth disk surface, i.e. when the head is not in use, can lead to the problem of "stiction", wherein the two closely matching surfaces stick to each other, causing possible damage during start/stop cycles. Manufacture of such disks thus typically includes a texturing step, to create a roughened substrate surface, characterized by submicron surface irregularities. The roughened surface reduces stiction between the disk and head by reducing surface contact between the two, particularly for start/stop cycles. Such texturing is often carried out only on a region near the inner opening of the disk, where the read/write head is "parked" when the disk is not operating.

Such texturing can lead to an undesirable increase in flying height if there is too much variation in the surface irregularities created. The best (lowest) flying head distances which have been achieved with plated metal-substrate disks polished by sanding or abrasion is about 6 microinches (mils).

Laser texturing of such magnetic media, in which spots on the surface are textured by controlled, laser-induced melting and subsequent resolidifying of the disk coating, has been reported to produce flying head distances in the range of one mil or less (Ranjan), a clear improvement over abrasion-based methods. For maximum uniformity in laser texturing, it is important to maintain a constant focus of the laser beam at the surface of the disk. Such disks are manufactured to a defined tolerance in thickness, such that the range of variation in thickness among a group of disks is typically about 0.002 inch (2 mils). Thus, when disks are placed sequentially in a conventional fixed holder for phototexturing, such variations in thickness can lead to loss of focus of the laser beam at the disk surface.

Thus, it is desirable to provide a laser texturing apparatus, and in particular a disk holder, which allows precise focus of the laser beam to be maintained at the disk surface, regardless of the exact thickness of the disk being textured.

SUMMARY OF THE INVENTION

The invention includes an apparatus for laser texturing the inner annular region of a substrate, corresponding to the start/stop region of a thin-film medium formed on the substrate. The apparatus includes a Bernoulli-type holder having a support face adapted to confront an outer annular surface region of the substrate, a pair of supports adapted to contact the substrate's outer edge at a pair of spaced apart locations, under the force of gravity, and a gas-supply to direct a stream of gas between the support face and such outer annular surface region of the substrate, to support the substrate on the holder at a stationary position with a known, defined distance between the support face and confronting annular surface region of the substrate.

A pulsed laser in the apparatus produces a pulsed laser beam having an energy effective to phototexture the surface of the substrate, and an optical assembly in the apparatus is designed to direct the laser beam onto a focused spot on the substrate's inner annular region, with the substrate supported on said holder, and to vary the position of the spot on the substrate's inner annular surface region of the substrate.

In one general embodiment, the support face defines a central opening dimensioned to encompass the central opening of the substrate and the adjacent inner annular region of the substrate. The laser is designed to direct its beam through the central openings of the support face and substrate supported on the holder, and the optical assembly includes a mirror assembly for directing the beam onto the inner annular region of the substrate facing the support face.

In another general embodiment, the support face defines a central opening, said laser is designed to direct its beam through the central openings of the support face and substrate supported on the holder, and the optical assembly includes a mirror assembly for directing the beam onto the inner annular region of the substrate opposite the support face.

These and other objects and features of the invention will become more fully apparent when the following detailed description of the invention is read in conjunction with the accompanying drawings.

DETAILED DESCRIPTION OF THE INVENTION

I. Definitions

The terms below have the following meanings unless indicated otherwise.

"Phototexturing" refers to the production of a textured topography on a magnetic disk surface, typically within an alloy coating of the disk, by controlled, laser-induced melting and subsequent resolidifying of the coating at spots upon which the laser is focused. Such phototexturing typically forms a small "crater" at each spot. Although the topography of the surface is altered, no material is removed from the disk during phototexturing.

A "focused" spot on a disk onto which a laser is directed, in the present apparatus and method, typically includes a small, controlled area, rather than a single point, of the disk, upon which the laser beam impinges.

II. Laser Texturing Apparatus

Figure 1:
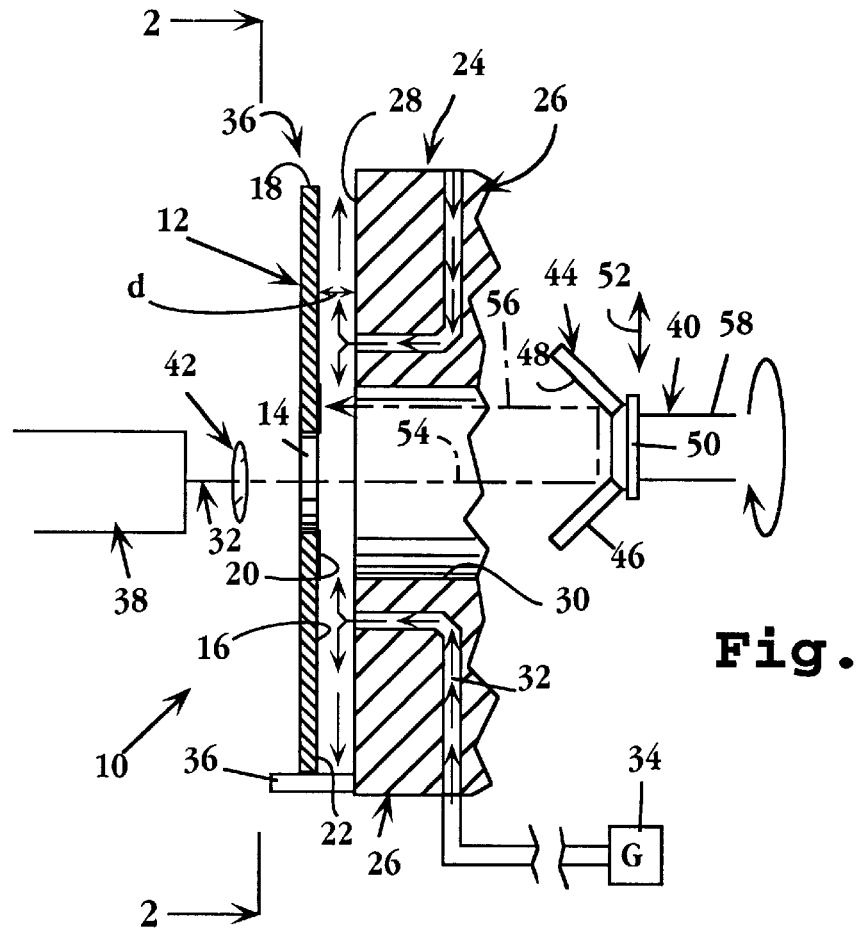
FIG. 1 shows a side, cross-sectional view of a laser texturing apparatus in accordance with one embodiment of the invention, with a substrate supported operatively in the apparatus.

FIG. 1 shows a laser texturing apparatus 10 constructed in accordance with one embodiment of the invention. The apparatus is suitable for producing a uniformly textured surface region on a magnetic disk substrate, such as that shown at 12. The substrate is intended for use, after texturing, in producing a thin-film recording medium, by successively sputtering on both sides of the substrate, an underlayer, a magnetic layer, and a wear-resistant overcoat, according to well-known methods.

Figure 2:
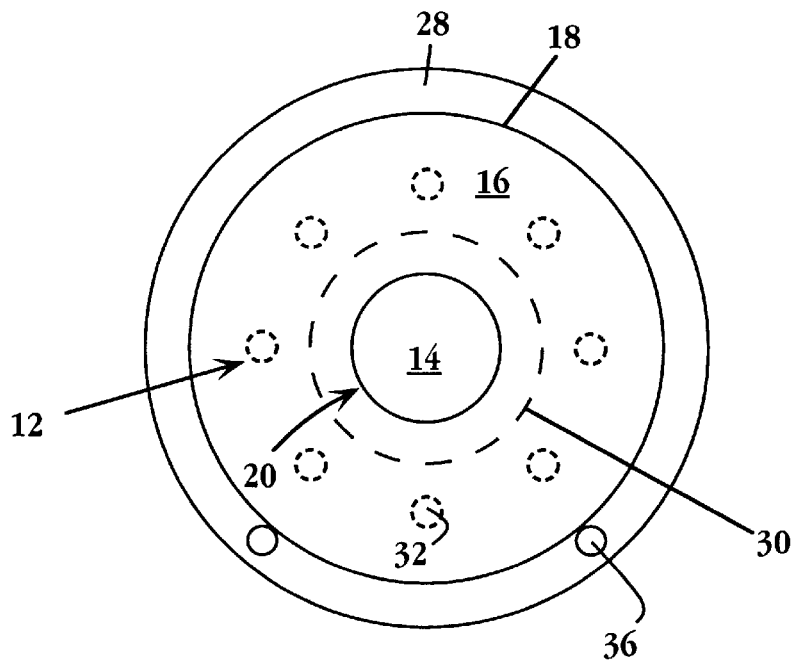
FIG. 2 shows the apparatus in FIG. 1 as viewed along the line 2—2 in FIG. 1.

With reference to FIGS. 1 and 2, the substrate has a central opening 14, and on each side of the substrate, an annular planar surface, such as surface 16 extending between opening 14 and the substrate's outer edge 18. Each substrate surface includes an inner annular region, such as region 20, adjacent the substrate's central opening, corresponding to the start/stop region of a thin-film medium formed with the substrate, and an outer annular region 22 corresponding to the data zone of the medium.

With continued reference to FIG. 1, the apparatus includes a Bernoulli-type holder 24 for supporting the disk during a texturing operation. The holder has a planar, annular ring-shaped structure 26 defining a support surface 28, which lies in a plane parallel to the surface of a supported disk. In the embodiment shown, where laser texturing is accomplished on the side of the substrate confronting surface 28, structure 26 has a central opening 30 which "spans" or encompasses the substrate's central opening and adjacent inner annular region. That is, the diameter of opening 30 is as least as great as the diameter of the substrate's central opening and adjacent inner annular region. As shown in the drawing, when a substrate is operatively placed on the holder, the substrate's central opening is aligned with the opening in structure 26, and the inner annular region of the substrate is exposed through the structure's opening.

Provided within structure 26 are passages or conduits such as shown at 32 (also seen in dotted circles in FIG. 2). The conduits conduct gas from a gas-supply source 34 to the support surface, where the gas is directed against the confronting surface of the substrate supported on the disc. Gas flow between the surface of structure 26 and the confronting annular portion of the substrate's surface creates a Bernoulli effect which act to support the substrate on the holder, with a known, defined uniform distance, designated "d" in FIG. 1, between the structure's surface and the confronting surface. This distance, which is usually in the 1 mm range or less, can be controlled according to the arrangement of conduits and volume/rate of gas supplied. The design and operation of such Bernoulli-type holders, effective to maintain a disk at a known, constant position parallel thereto, and is described, for example, in Sumnitsch, Goodwin, Rahn, and Apgar.

Completing the description of the holder, a pair of single-point supports, such as support 36, at the lower portion of structure 26, functions to make two-point contact the outer edge of the substrate, under the force of gravity, to "center" the substrate on the holder structure. It will be appreciated that the two supports may be a single arcuate surface making contact with the substrate outer edge at points along the arc.

Apparatus 10 further includes a laser 38 for producing a phototexturing beam. One suitable laser is a pulsed-mode Nd-YAG laser. The laser emits a pulsed beam of sufficient energy to phototexture a spot on the surface region of the disk upon which the beam is focused. The energy of the laser pulse used for photo-texturing will depend on the nature of the surface being textured; for nickel-phosphorus coatings, a preferred range is 1 to 20 microjoules per pulse.

Such laser texturing, and the topography of the "spots" produced, is described in, for example, Ranjan and Nguyen. Such spots are typically crater-like indentations having a surrounding rim higher than the surface of the disk. The surface features of the textured spots, such as the height of the rim, are dependent on such factors as the type of material beings textured, the pulse energy and pulse width of the laser source, and the size of the spot (Nguyen). The size of the spot is determined by the area of disk surface impinged by the laser beam, which in turn depends on the focusing of the beam at the disk surface.

In the embodiment shown, the laser is situated on the opposite side of the substrate surface to be textured. An optical assembly 40 in the apparatus includes a lens 42 (or lens system) for focusing the beam at a spot on the substrate surface and a mirror assembly 44 for reflecting the beam from the laser onto the substrate surface, as illustrated in FIG. 1.

The mirror assembly includes a pair of orthogonally disposed mirrors 46, 48 arranged to back reflect the laser beam as shown, and a mirror support 50 which is movable in the direction of arrow 52 to vary the distance between beam axis 54 and the back-reflected axis 56. As can be appreciated, the mirror arrangement is such as to preserve the total beam-travel distance between lens 42 and the targeted spot on the substrate, as the position of the beam is shifted radially by shifting support 50. The lens, shown in FIG. 1 interposed between the laser and disk substrate, could also be fixed relative to the second mirror at a position in the optical path between this mirror and the substrate surface, as in FIG. 4, and still provide the benefits of the invention.

Figure 3:
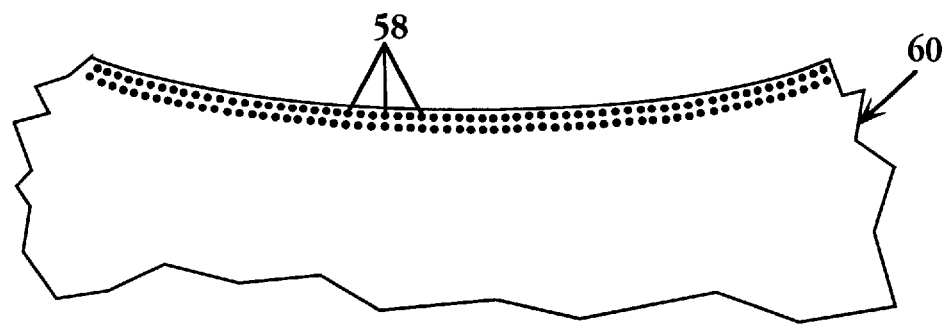
FIG. 3 shows a inner annular region of a substrate textured in accordance with the invention.

The mirror support, in turn, is mounted on a post 58 for rotation thereon about an axis parallel to the beam axis, as seen. Rotation of the mirror support acts to change the angular position of the beam impinging on the substrate, with one rotation of the support causing the position of the beam to undergo one complete revolution. In operation, the speed of mirror rotation and rate of movement of the mirror support are adjusted in relation to the frequency of the laser, to produce a shallow spiral of phototextured spots, such as those indicated in FIG. 3 at 58 in the inner annular region of a substrate, shown fragmentarily at 60. It will be appreciated that a variety of other annular patterns of spots, including concentric spot patterns, or crossing patterns, can be produced.

It will also be appreciated that alternative optical assembly constructions may shift the lateral and angular position of the focused beam on the substrate, to produce a desired annular pattern of spots in the substrate's inner annular region.

Figure 4:
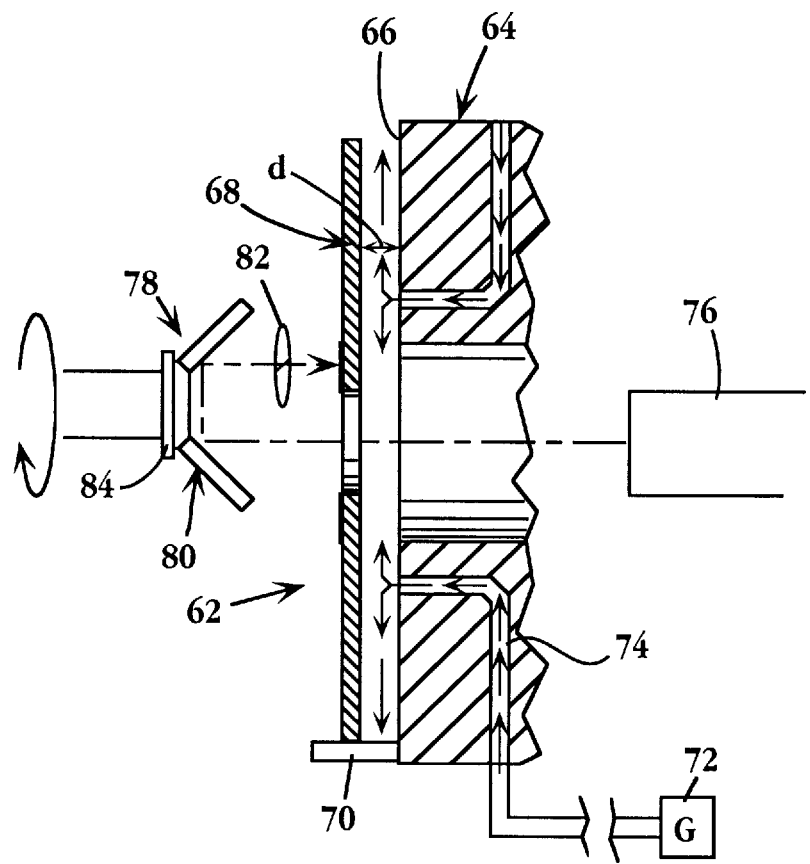
FIG. 4 shows a side, cross-sectional view of a laser texturing apparatus in accordance with a second general embodiment of the invention, with a substrate supported operatively in the apparatus.

FIG. 4 shows a texturing apparatus 62 constructed in accordance with a second embodiment of the invention. The apparatus includes a Bernoulli-type holder 64 of the type described above with respect to FIG. 1, including a support face 66 adapted to confront an outer annular surface region of a substrate 68, a pair of support surfaces, such as provided by rod 70, adapted to contact the substrate's outer edge at a pair of spaced apart locations, under the force of gravity, and a gas supply 72, for directing a stream of gas, through conduits such as conduit 74, between the support face and the outer annular surface region of the substrate. The holder acts to support the substrate on the holder at a stationary position with a known, defined distance "d" between the support face and confronting annular surface region of the substrate.

As seen in FIG. 4, apparatus 62 is intended to texture an inner annular region of the outer surface of the substrate, i.e., the surface opposite that confronting the Bernoulli surface in the apparatus. To this end, the apparatus includes a laser 76 located on the side of holder 64 opposite the substrate, and an optical assembly 78 designed to focus the laser beam onto the substrate's outer surface, as shown. As in apparatus 10, the optical assembly here includes a mirror assembly 80 for reflecting the laser beam onto the substrate's outer surface, and a lens 82 for focusing the beam onto a surface region of the substrate. The mirror assembly rotates about an axis parallel to the beam, to alter the position of the beam spot on the substrate, and a shiftable platform to alter the radial position of the beam spot on the substrate surface, as described above for apparatus 10.

In operation, and with respect to either embodiments of the apparatus 1 illustrated in FIG. 1, a substrate is placed adjacent the apparatus holder, e.g., by a robotic handling device or the like, with the substrate being supported on its outer edge by the two support surfaces. The holder support surface is either vertically disposed, or tilted so that the substrate's outer edge rests against the support surfaces under gravity. With a selected level of gas flow through the holder, the substrate is supported on the holder a known, selected distance "d" from the support face.

As can be appreciated, the placement of the substrate on the holder allows precise placement of a substrate at a known, selected distance from the holder support surface, but without edge-gripping mechanisms, which may damage the disc, or without special structure for positioning the disc, which adds to the time and expense of placing the substrate at a selected position on the disc. The precise placement is required in laser texturing to retain the focus of the beam on the substrate surface.

In apparatus 10, texturing is carried out on the inner surface of the substrate, with the desired annular pattern being produced by rotation and translation of the optical assembly as described above. In accordance with another advantage of this embodiment of the invention, the distance between the laser and surface being textured is precisely known and the same from substrate to substrate, so that the laser beam is always correctly focused on the inner substrate surface being textured.

While the invention has been described with reference to specific methods and embodiments, it will be appreciated that various modifications may be made without departing from the invention.

It is claimed:

1. An apparatus for laser texturing the inner annular region of a substrate, corresponding to the start and stop region of a thin-film medium formed on the substrate, where the substrate has a central opening, and on each of the opposite faces of the substrate, an inner annular surface region adjacent the central opening, and an outer annular surface region extending from the inner region to an outer edge of the substrate, said apparatus comprising a Bernoulli holder having a support face adapted to confront an outer annular surface region of the substrate, a pair of support surfaces adapted to contact the substrate's outer edge at a pair of spaced apart locations, under the force of gravity, and gas supply means adapted to direct a stream of gas between the support face and the outer annular surface region of the substrate, to support the substrate on the holder at a stationary position with a known, defined distance between the support face and confronting annular surface region of the substrate, a laser for generating a pulsed laser beam having an energy effective to phototexture the surface of the substrate, and an optical assembly for directing the laser beam onto a focused spot on one of the inner annular regions of the substrate with the substrate supported on said holder, and for varying the position of the spot on the substrate, with the substrate supported in a stationary position.

2. The apparatus of claim 1, wherein said support face defines a central opening dimensioned to encompass the central opening of the substrate and the adjacent inner annular region of the substrate, said laser is adapted to direct its beam through the central opening of the support face and substrate supported on the holder, and the optical assembly includes a mirror assembly for directing the beam onto the inner annular region of the substrate facing the support face.

3. The apparatus of claim 1, wherein said support face defines a central opening, said laser is adapted to direct its beam through the central opening of the support face and substrate supported on the holder, and the optical assembly includes a mirror assembly for directing the beam onto the inner annular region of the substrate opposite the support face.

* * * * *